(No Model.)

F. L. H. SIMS.
TYPE WRITING MACHINE.

No. 476,833. Patented June 14, 1892.

Witnesses.
Blanche Boyd
L. Foulds

Inventor.
Fred L. H. Sims
by Sehustenbaugh & Co.
Attys.

UNITED STATES PATENT OFFICE.

FREDERICK L. H. SIMS, OF TORONTO, CANADA.

TYPE-WRITING MACHINE.

SPECIFICATION forming part of Letters Patent No. 476,833, dated June 14, 1892.

Application filed August 3, 1891. Serial No. 401,491. (No model.)

*To all whom it may concern:*

Be it known that I, FREDERICK LINDLEY HUNT SIMS, manufacturer, of the city of Toronto, in the county of York, in the Province of Ontario, Canada, have invented certain new and useful Improvements in Type-Writing Machines, of which the following is a specification.

My invention relates to that class of type-writers in which the movement of the carriage is controlled by a toothed rack and a dog and pawl acting in conjunction therewith; and the object of the invention is to provide a simple and effective means of adjusting the dog so as to readily take up the wear, and thus insure at all times a minimum of lost motion in the operation of the dog and pawl upon each tooth of the rack; and it consists, essentially, of pivoting the dog on the outer end of the pin, the inner end of which is smaller in diameter and is eccentrically located in reference to the outer end, and, furthermore, in forming on the inner end of the pin a toothed pinion which meshes with the threaded end of a stationary set-screw, by which the outer end of the pin may be adjusted, as hereinafter more particularly explained.

Figure 1:
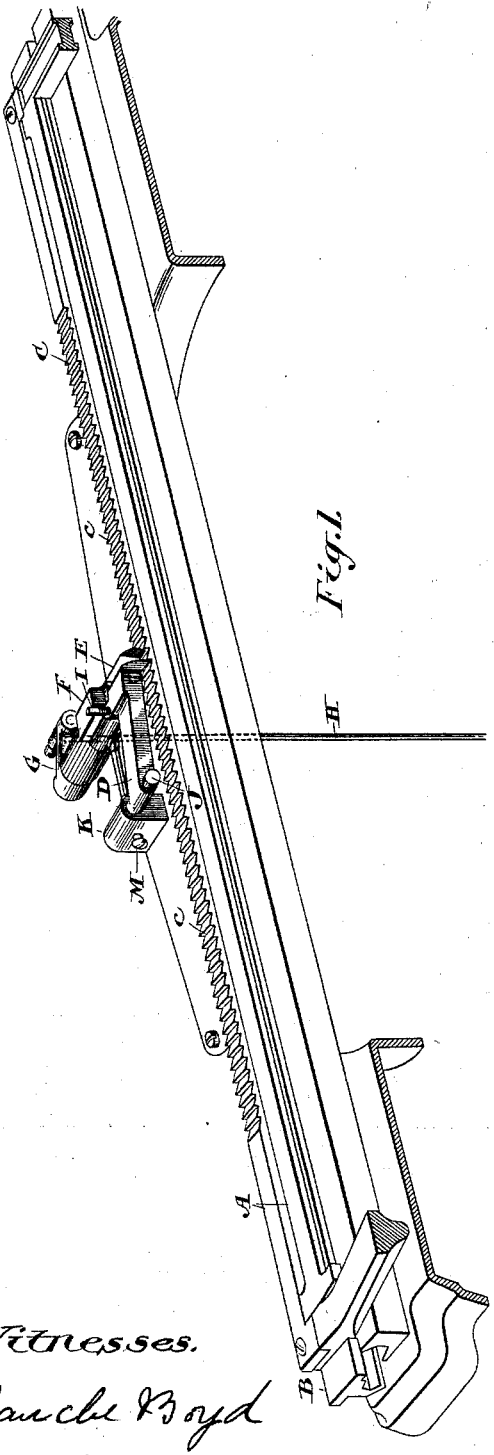
Figure 2:
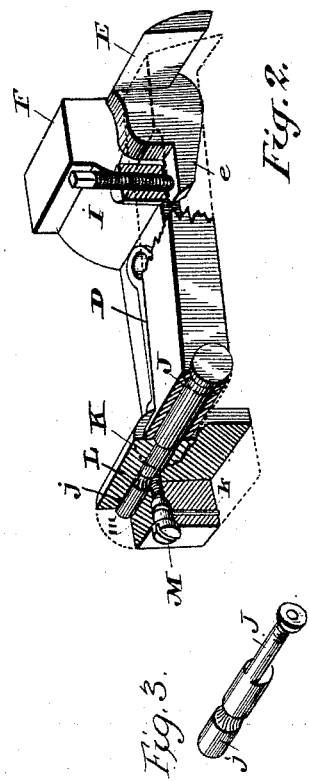
Figure 3:

Figure 1 is a perspective view of a portion of a type-writer, showing part of the carriage, the dog and pawl mechanism, and the movement rack controlled by the said mechanism. Fig. 2 is an enlarged perspective view partially in section, showing the means of adjusting the dog in relation to the pawl. Fig. 3 is a perspective view of a modified form of pin.

In the drawings like letters of reference indicate corresponding parts in each figure.

A is the carriage; B, the track upon which it moves; C, the movement-rack, in which are cut the ratchet-teeth c. D is the dog, and E the pawl, the spindle of which extends through the bearing-box F and has a crank G secured on the other end, as shown. H is a rod connected to the end of the crank G. The rod H is operated at each downward movement of the type-keys; but as I do not claim anything new in the method of operating I do not show it. The dog D is pivoted on the pin J, having its bearing in the box K.

It will be noticed on reference to Fig. 2 that the inner end *j* of the pin J is smaller in diameter than the outer end, and also the circumference is eccentric to the circumference of the outer end.

L is a screw-gear cut in the inner end of the pin J.

M is a screw extending into the box K, beneath the inner end *j* of the pin J. The threaded end of the screw M meshes with the screw-gear L, as shown.

*m* is an annular groove made in the screw M, and *k* is a pin extending into the annular groove *m*, so as to hold the screw M stationary while being turned. It will thus be seen that by adjusting the screw M the outer end of the pin J will be turned in such a manner as to bring the engaging end of the dog D nearer to or farther from the engaging end of the pawl E, as may be required.

On reference to Figs. 1 and 2 it will be seen that the dog D and pawl E act in conjunction with one another, a set-screw I being provided, the bottom end of which rests against the extension-piece *e* of the pawl E, as shown, so that when the rod H moves downwardly the crank G throws the pawl E down so as to engage with the teeth and the dog D upwardly away from the line of the teeth; but when the rod H moves upwardly again the movement of the dog D and pawl E are reversed. The pawl and dog are so arranged that the dog D comes below the line of the top of the teeth before the pawl E leaves the line of the teeth, and the pawl E comes again within the line of the teeth before the dog D leaves the line of the teeth.

It is with the object of adjusting to a nicety the distance between the engaging end of the dog D and the engaging end of the pawl E that my invention is chiefly designed, and it will be seen from the above description that I have provided a very simple and effective means of adjusting the relative positions of the dog and pawl so that there will be only a minimum of lost motion in each tooth of the rack as the carriage is caused to move forward when released by the operation of the rod H, as hereinbefore described. It will be readily understood that I might accomplish the same result by making the outer end of the pin of smaller diameter than the inner end and the circumference of the outer end eccentric with the circumference of the inner end, as in Fig. 3, and I wish it to be understood that I claim this latter alternative form in this specification.

What I claim as my invention is—

1. In a type-writer, and in combination, the pawl E, the dog D, and holding and adjusting means for the said dog, comprising the pin J, having one end smaller than the other and eccentric thereto, substantially as described.

2. In a type-writer, and in combination, the pawl E, the dog D, the pivot-pin for the dog, having one end smaller than the other and eccentric thereto, the said pin having the screw-gear thereon, the screw M, engaging therewith, and the pin $k$, extending into the annular groove in the screw, substantially as described.

FREDK. L. H. SIMS.

Witnesses:
 BLANCHE BOYD,
 L. FOULDS.